United States Patent
Chaganti et al.

(10) Patent No.: US 11,436,059 B2
(45) Date of Patent: Sep. 6, 2022

(54) METHOD AND SYSTEM FOR PROXIMITY BASED WORKLOAD AND DATA PLACEMENT

(71) Applicant: Dell Products L.P., Hopkinton, MA (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 47 days.

(21) Appl. No.: 16/821,935

(22) Filed: Mar. 17, 2020

(65) Prior Publication Data
US 2021/0294668 A1 Sep. 23, 2021

(51) Int. Cl.
*G06F 9/50* (2006.01)
*G06F 11/30* (2006.01)
*G06F 9/48* (2006.01)

(52) U.S. Cl.
CPC .......... *G06F 9/5083* (2013.01); *G06F 9/4881* (2013.01); *G06F 9/505* (2013.01); *G06F 11/3006* (2013.01); *G06F 2209/508* (2013.01)

(58) Field of Classification Search
CPC ...... G06F 9/5083; G06F 9/4881; G06F 9/505; G06F 11/3006; G06F 2209/508
See application file for complete search history.

(56) References Cited

U.S. PATENT DOCUMENTS

2018/0129443 A1* 5/2018 Karve ................ G06F 3/061

* cited by examiner

*Primary Examiner* — Sisley N Kim
(74) *Attorney, Agent, or Firm* — Chamberlain, Hrdlicka, White, Williams & Aughtry

(57) ABSTRACT

A method and system for proximity based workload and data placement. Specifically, the disclosed method and system improve the efficiency and responsiveness of workload and/or workload data access to end-users through dynamic and automated needs detection and replication or migration orchestration between infrastructures (or geographical areas).

14 Claims, 7 Drawing Sheets

METHOD AND SYSTEM FOR PROXIMITY BASED WORKLOAD AND DATA PLACEMENT

BACKGROUND

Within public and hybrid cloud infrastructures, workload and/or workload data placement is often offered by vendors to create data and workload affinity. Presently, however, placement options are contingent on manual rules and fail to support proximity based solutions dictated by dynamic end-user needs.

SUMMARY

In general, in one aspect, the invention relates to a method for resource placement. The method includes selecting, from an access heat map, a first heat map element using a selection criterion, identifying, in association with the first heat map element, a first resource and a first access source, determining, based on a first resource type of the first resource, a first placement operation type, and orchestrating, onto the first access source, a first placement operation of the first placement operation type targeting the first resource.

In general, in one aspect, the invention relates to a non-transitory computer readable medium (CRM). The non-transitory CRM includes computer readable program code, which when executed by a computer processor, enables the computer processor to select, from an access heat map, a first heat map element using a selection criterion, identify, in association with the first heat map element, a first resource and a first access source, determine, based on a first resource type of the first resource, a first placement operation type, and orchestrate, onto the first access source, a first placement operation of the first placement operation type targeting the first resource.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for proximity based workload and data placement. Specifically, one or more embodiments of the invention improve the efficiency and responsiveness of workload and/or workload data access to end-users through dynamic and automated needs detection and replication or migration orchestration between infrastructures (or geographical areas).

Figure 1:
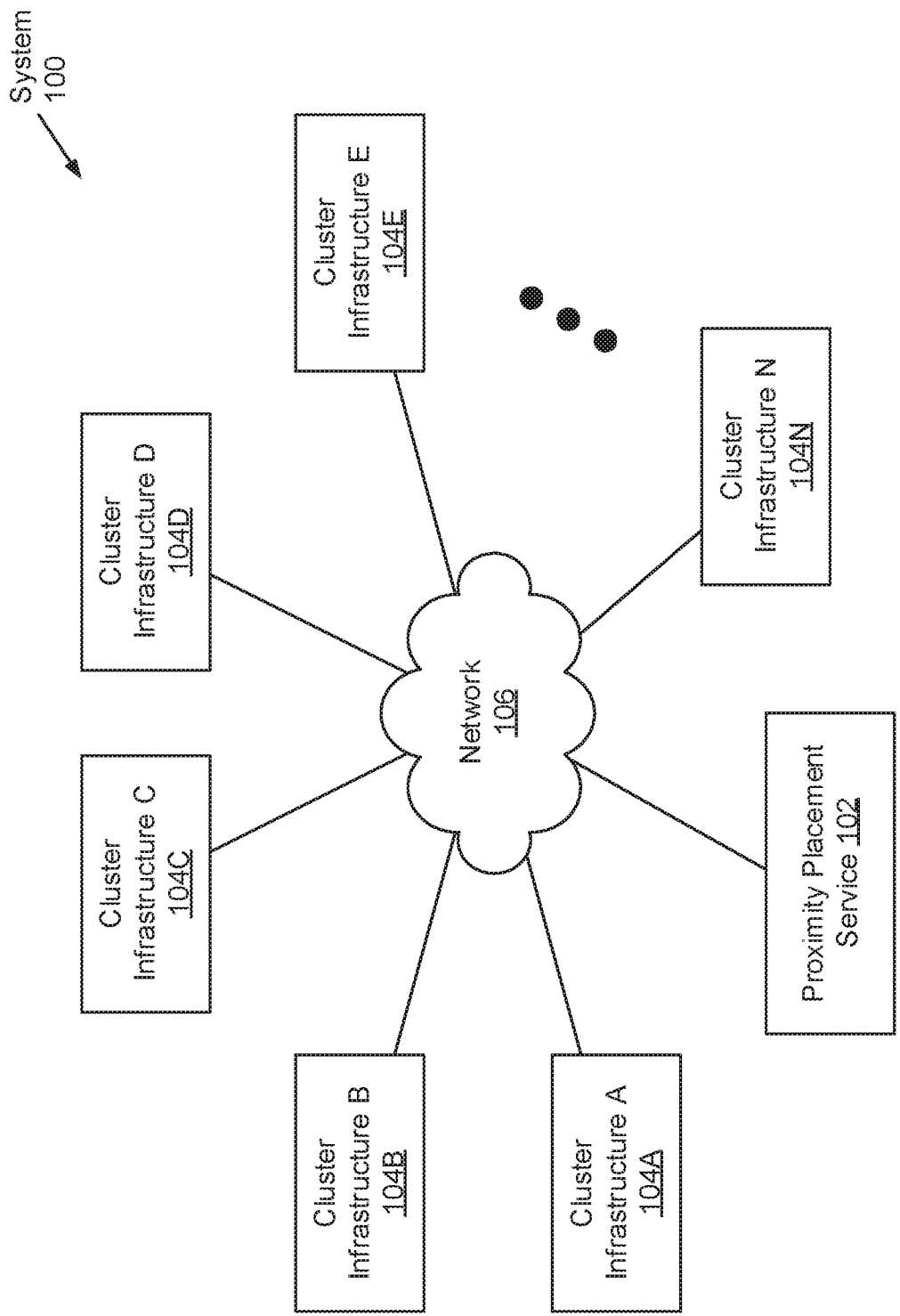
FIG. 1 shows a system in accordance with one or more embodiments of the invention.

FIG. 1 shows a system in accordance with one or more embodiments of the invention. The system (100) may include two or more cluster infrastructures (104A-104N) operatively connected to one another and a proximity placement service (102). Each of these system (100) components is described below.

In one embodiment of the invention, the above-mentioned system (100) components may directly or indirectly connect to one another through a network (106) (e.g., a local area network (LAN), a wide area network (WAN) such as the Internet, a mobile network, any other network type, or any combination thereof). The network (106) may be implemented using any combination of wired and/or wireless connections. In embodiments in which the above-mentioned system (100) components may be indirectly connected, the network (106) may include networking devices or systems (e.g., switches, routers, gateways, etc.) configured to facilitate communications between the above-mentioned system (100) components. Further, the above-mentioned system (100) components may interact with another using any combination of wired and/or wireless communication protocols.

In one embodiment of the invention, the proximity placement service (102) may represent an enterprise workload and/or workload data movement service capable of proactively identifying and, if necessary, orchestrating proximity based migrations between cluster infrastructures (104A-104N). The proximity placement service (102) may be implemented using one or more servers (not shown). Each server may represent a physical or virtual server, which may reside in a datacenter or a cloud computing environment. Additionally or alternatively, the proximity placement service (102) may be implemented using one or more computing systems similar to the exemplary computing system shown in FIG. 6. The proximity placement service (102) is described in further detail below with respect to FIG. 3.

In one embodiment of the invention, a cluster infrastructure (104A-104N) may represent a configuration of various information technology (IT) components (e.g., servers, storage, networking, management, etc.) directed to hosting and maintaining various workloads, and their corresponding workload data. These workloads (described below) and workload data may be pertinent to the day-to-day operations of a given organization, or to various unaffiliated tenants, located within a given geographical area that the cluster infrastructure (104A-104N) services. Cluster infrastructures (104A-104N) are described in further detail below with respect to FIG. 2.

In one embodiment of the invention, a workload (not shown) may refer to a cluster infrastructure (104A-104N) resource configured to perform certain work functions. Workloads may be instantiated, and may operate while consuming at least a portion of computing resources (e.g., processing, storage/memory, virtualization, networking, etc.) available, on a hosting cluster infrastructure (104A-104N). Examples of a workload may include, but are not limited to, a virtual machine, a container, a database, an application, and a collection of micro-services. Furthermore, workload data pertinent to a given workload may include, but is not limited to, output data generated by the given workload, input data necessary to the work function(s) of the given workload, configuration data definitive of the behavior and computing resources requirements of the given workload, and any metadata respective to any combination thereof.

While FIG. 1 shows a configuration of components, other system (100) configurations may be used without departing from the scope of the invention.

Figure 2:
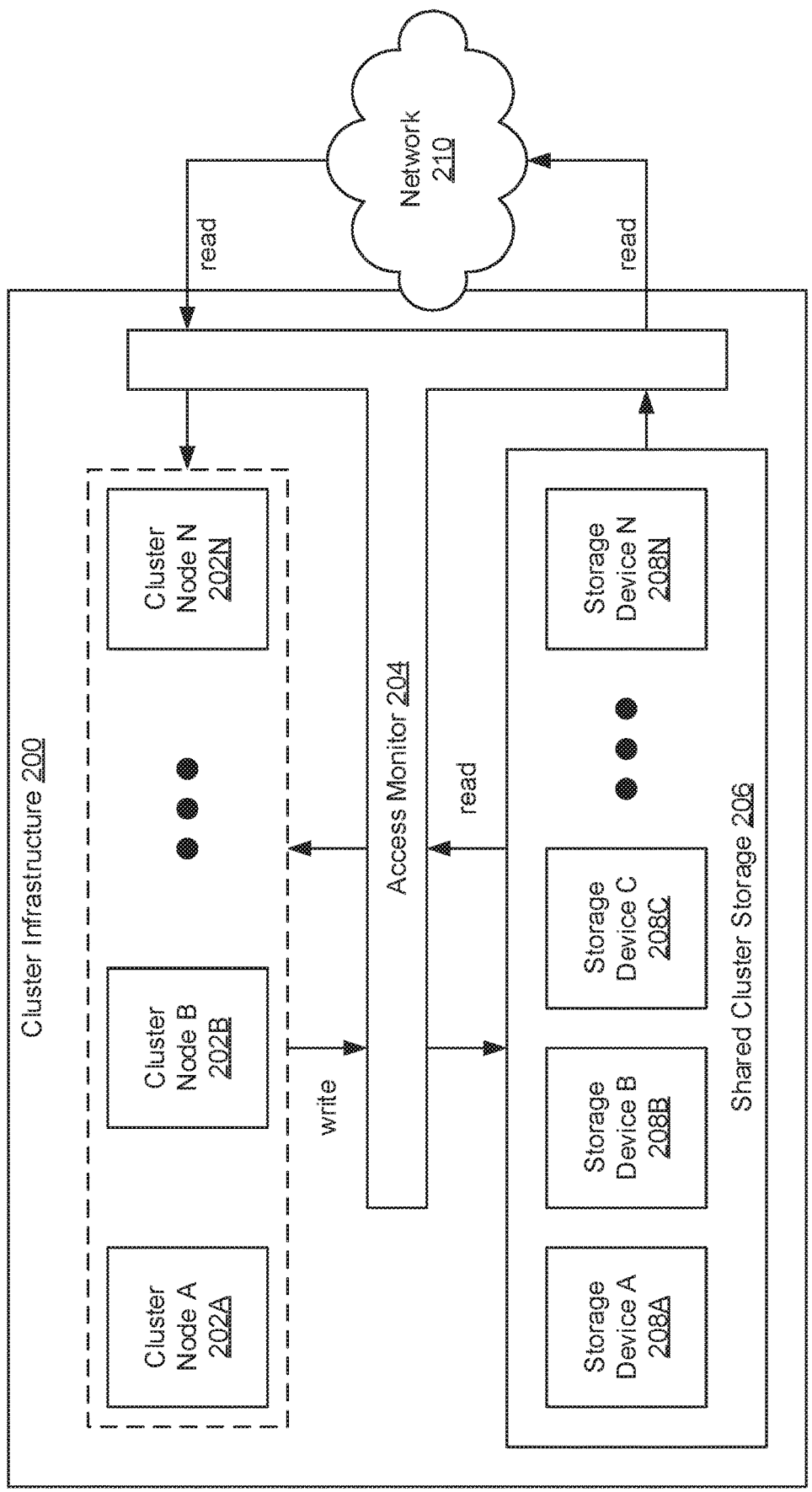
FIG. 2 shows a cluster infrastructure in accordance with one or more embodiments of the invention.

FIG. 2 shows a cluster infrastructure in accordance with one or more embodiments of the invention. The cluster infrastructure (200) may include one or more cluster nodes (202A-202N), an access monitor (204), and a shared cluster storage (206). Each of these cluster infrastructure (200) subcomponents is described below.

In one embodiment of the invention, a cluster node (202A-202N) may represent a physical computing system capable of hosting one or more workloads (described above), or capable of providing a computing environment whereon workloads may be implemented. To that extent, a cluster node (202A-202N) may be configured with computing resources (e.g., processing, storage/memory, virtualization, networking, etc.), which may be provisioned and consumed, as needed, by the workload(s) hosted thereon. Furthermore, a cluster node (202A-202N) may include functionality to access (i.e., invoke workload instances, submit workload data read and/or write requests, etc.) to one or more workloads, and/or workload data, hosted locally in the cluster infrastructure (200) or remotely in one or more other cluster infrastructures (not shown) over the network (210). One of ordinary skill will appreciate that a cluster node (202A-202N) may perform other functionalities without departing from the scope of the invention. Moreover, a cluster node (202A-202N) may be implemented using a server, a mainframe, a workstation computer, or any other computing system similar to the exemplary computing system shown in FIG. 6.

In one embodiment of the invention, the access monitor (204) may refer to a physical computing system (see e.g., FIG. 6) residing on, or a computer program that may execute on the underlying hardware of, the cluster infrastructure (200). Specifically, the access monitor (204) may track accesses directed to locally hosted workloads and locally stored workload data from both local and remote sources (e.g., local and remote end-users). To that extent, the access monitor (204) may include functionality to monitor workload and/or workload data accesses in real- or near real-time, as well as maintain records capturing these accesses over periods of time. The access monitor (204) may include further functionality to push access information, detailing cross-geographical workload and/or workload data access, to the proximity placement service (not shown) (see e.g., FIG. 1) over the network (210). One of ordinary skill will appreciate that the access monitor (204) may perform other functionalities without departing from the scope of the invention.

In one embodiment of the invention, the shared cluster storage (206) may refer to a collection of one or more physical storage devices (208A-208N) on which various forms of digital data—e.g., workload data pertinent to one or more locally hosted workloads—may be consolidated. Each physical storage device (208A-208N) may encompass non-transitory computer readable storage media on which data may be stored in whole or in part, and temporarily or permanently. Further, each physical storage device (208A-208N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the shared cluster storage (206) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 2 shows a configuration of subcomponents, other cluster infrastructure (200) configurations may be used without departing from the scope of the invention. For example, in one embodiment of the invention, the shared cluster storage (206) may alternatively be implemented as a virtual storage pool (or a logical pool of disk capacity) formed from storage resources available across the cluster nodes (202A-202N).

Figure 3:
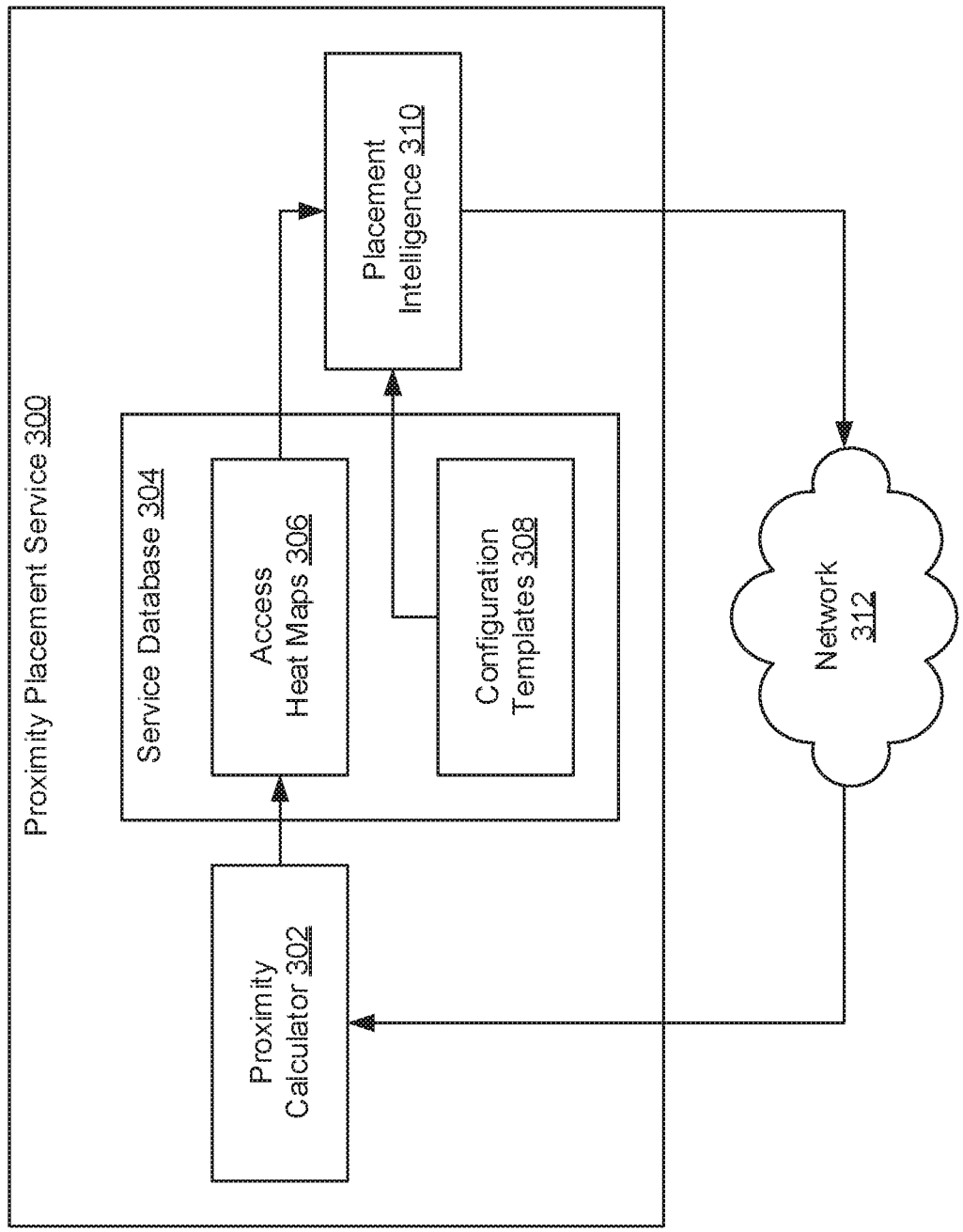
FIG. 3 shows a proximity placement service in accordance with one or more embodiments of the invention.

FIG. 3 shows a proximity placement service in accordance with one or more embodiments of the invention. The proximity placement service (300) may include a proximity calculator (302), a service database (304), and a placement intelligence (310). Each of these proximity placement service (300) subcomponents is described below.

In one embodiment of the invention, the proximity calculator (302) may refer to a computer program that may execute on the underlying hardware of the proximity placement service (300). Substantively, the proximity calculator (302) may be responsible for rendering (or updating) workload and workload data access heat maps (306) (described below) pertinent to the proactive movement of workloads and/or workload data based on proximity-relevant accesses. To that extent, the proximity calculator (302) may include functionality to perform the various steps outlined in the flowcharts of FIGS. 4A and 4B, which may be directed to a method for updating access heat maps in accordance with one or more embodiments of the invention. Further, one of ordinary skill will appreciate that the proximity calculator (302) may perform other functionalities without departing from the scope of the invention.

In one embodiment of the invention, the service database (304) may refer to a data repository for storing various information pertinent to proximity based workload and/or workload data placement between cluster infrastructures (not shown). The service database (304) may be implemented using one or more physical storage devices (not shown). Each physical storage device may encompass non-transitory computer readable media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the service database (304) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the various information stored in the service database (304) may include the above-mentioned workload and workload data access heat maps (306). The workload and workload data access heat maps (306) may each refer to a two-dimensional (2D) data structure (e.g., table or matrix) defined through a set of heat map elements, where each heat map element may be indexed by a heat map row-column pair and may store an access intensity (or incoming connection) value.

In one embodiment of the invention, concerning the workload access heat map (306): one of the two dimensions (i.e., row or column) may map to the various active workloads (not shown) hosted across the various cluster infrastructures (not shown); the other of the two dimensions (i.e., column or row) may map to the various cluster infrastructures (or to the various geographical areas associated therewith) from which accesses to the various active workloads have been recorded over periods of time; and, accordingly, a given heat map element thereof may retain the number of incoming connections (or any derivative thereof) to a given active workload from a given cluster infrastructure (or geographical area). A simplified example of the workload access heat map (306) is portrayed below, where: row indices R1 to R6 may map to six different active workloads hosted across one or more of six different cluster infrastructures or geographical areas; column indices C1 to C6 may map to the aforementioned six different cluster infrastructures or geographical areas; and each element E(R,C) may store an access intensity value reflecting a number of incoming connections (i.e., established and/or attempted) that had been directed to the active workload mapped to row index R from the cluster infrastructure or geographical area mapped to column index C. For example, based on the below exemplary heat map, element E(3,4) shows that four (4) incoming connections have been established and/or attempted with the active workload mapped to row index R3, where the connections had been sourced from the cluster infrastructure (or geographical area) mapped to column index C4. Further, the source cluster infrastructure (or geographical area) may be the local cluster infrastructure (or geographical area) where the aforementioned active workload may be hosted or may be a remote cluster infrastructure (or geographical area).

| Exemplary Workload (or Workload Data) Heat Map | | | | | |
|---|---|---|---|---|---|
| C1 | C2 | C3 | C4 | C5 | C6 |
| R1 E(1, 1) = 3 | E(1, 2) = 8 | E(1, 3) = 5 | E(1, 4) = 0 | E(1, 5) = 3 | E(1, 6) = 7 |
| R2 E(2, 1) = 2 | E(2, 2) = 2 | E(2, 3) = 9 | E(2, 4) = 5 | E(2, 5) = 1 | E(2, 6) = 2 |
| R3 E(3, 1) = 0 | E(3, 2) = 6 | E(3, 3) = 1 | E(3, 4) = 4 | E(3, 5) = 0 | E(3, 6) = 3 |
| R4 E(4, 1) = 8 | E(4, 2) = 4 | E(4, 3) = 9 | E(4, 4) = 1 | E(4, 5) = 7 | E(4, 6) = 4 |
| R5 E(5, 1) = 6 | E(5, 2) = 9 | E(5, 3) = 3 | E(5, 4) = 3 | E(5, 5) =1 | E(5, 6) = 7 |
| R6 E(6, 1) = 3 | E(6, 2) = 0 | E(6, 3) = 1 | E(6, 4) = 6 | E(6, 5) = 9 | E(6, 6) = 5 |

In one embodiment of the invention, concerning the workload data access heat map (306): one of the two dimensions (i.e., row or column) may map to the various active workload data (not shown) maintained across the various cluster infrastructures (not shown); the other of the two dimensions (i.e., column or row) may map to the various cluster infrastructures (or to the various geographical areas associated therewith) from which accesses to the various active workload data have been recorded over periods of time; and, accordingly, a given heat map element thereof may retain the number of incoming connections (or any derivative thereof) to a given workload dataset from a given cluster infrastructure (or geographical area). A simplified example of the workload access heat map (306) is portrayed above, where: row indices R1 to R6 may map to six different active workload datasets maintained across six different cluster infrastructures or geographical areas; column indices C1 to C6 may map to the aforementioned six different cluster infrastructures or geographical areas; and each element E(R,C) may store an access intensity value reflecting a number of incoming connections (i.e., established and/or attempted) that had been directed to the active workload dataset mapped to row index R from the cluster infrastructure or geographical area mapped to column index C. For example, based on the above exemplary heat map, element E(5,1) shows that six (6) incoming connections have been established and/or attempted with the active workload mapped to row index R5, where the connections had been sourced from the cluster infrastructure (or geographical area) mapped to column index C1. Further, the source cluster infrastructure (or geographical area) may be the local cluster infrastructure (or geographical area) where the various active workloads may be hosted or may be a remote cluster infrastructure (or geographical area).

In one embodiment of the invention, the various information stored in the service database (304) may include workload and workload data configuration templates (308). A workload (or workload data) configuration template (308) may refer to a predefined or preformatted document that specifies one or more automation steps directed to the placement of a given workload (or given workload data) at/on a target cluster infrastructure (or geographical area). The aforementioned target cluster infrastructure (or geographical area) may be identified using the workload (or workload data) access heat map(s) (306) (described below). Further, these automation step(s) may disclose configuration parameters (e.g., computing resource (e.g., processing, storage/memory, virtualization, networking, etc.) requirements) and/or instructions for implementing the given workload (or given workload data) on/at a target cluster infrastructure (or geographical area).

In one embodiment of the invention, the placement intelligence (310) may refer to a computer program that may execute on the underlying hardware of the proximity placement service (300). Substantively, the placement intelligence (310) may be responsible for orchestrating the proactive placement (or migration) of workloads and/or workload data between cluster infrastructures (not shown) based on the workload and/or workload data access heat maps (306) and using the appropriate workload and/or workload data configuration templates (308). To that extent, the placement intelligence (310) may include functionality to perform the various steps outlined in the flowchart of FIG. 5, which may be directed to a method for proximity based workload and data placement in accordance with one or more embodiments of the invention. Further, one of ordinary skill will appreciate that the placement intelligence (310) may perform other functionalities without departing from the scope of the invention.

While FIG. 3 shows a configuration of subcomponents, other proximity placement service (300) configurations may be used without departing from the scope of the invention.

Figure 4A:
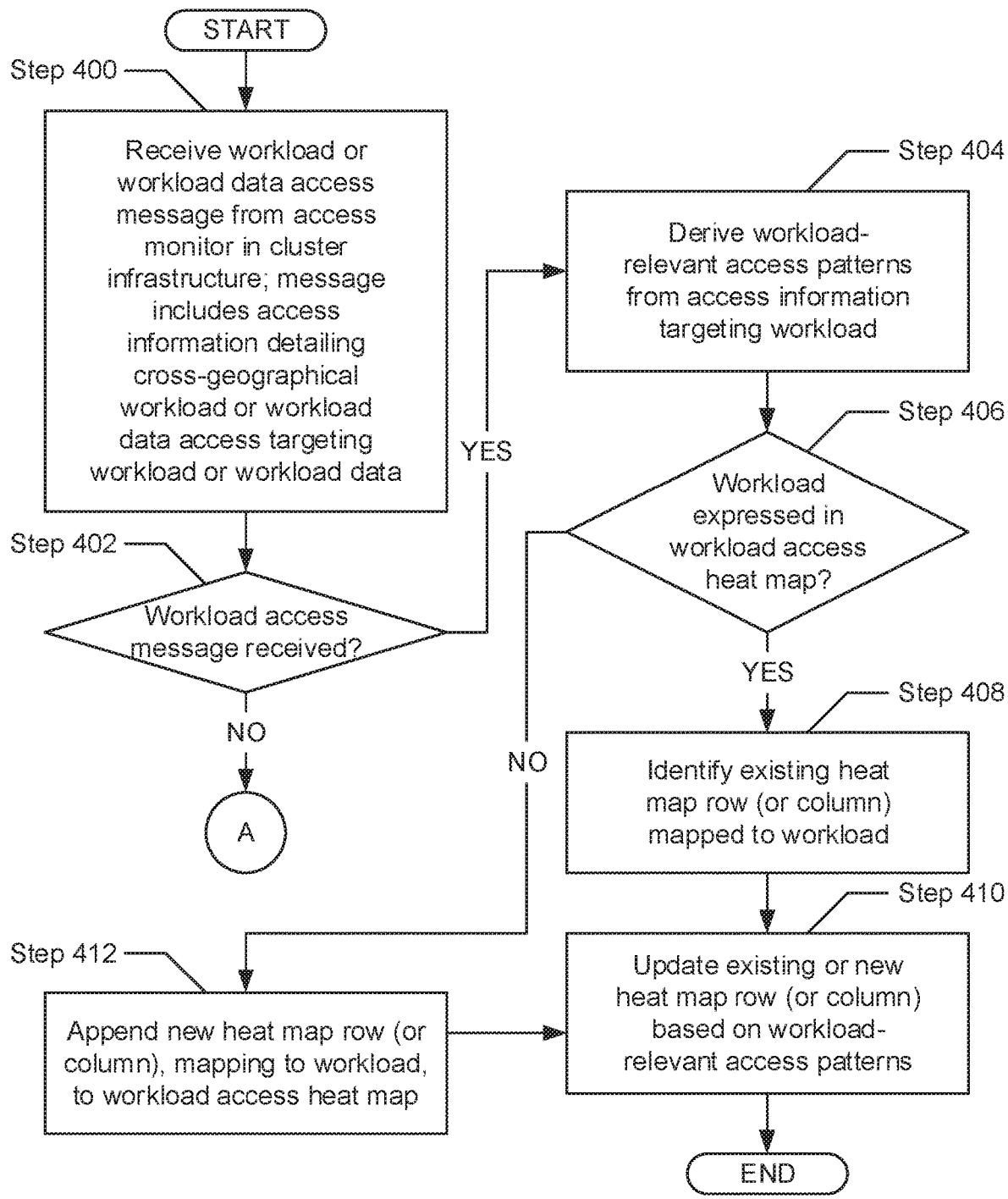
FIGS. 4A and 4B show flowcharts describing a method for updating access heat maps in accordance with one or more embodiments of the invention.
Figure 4B:
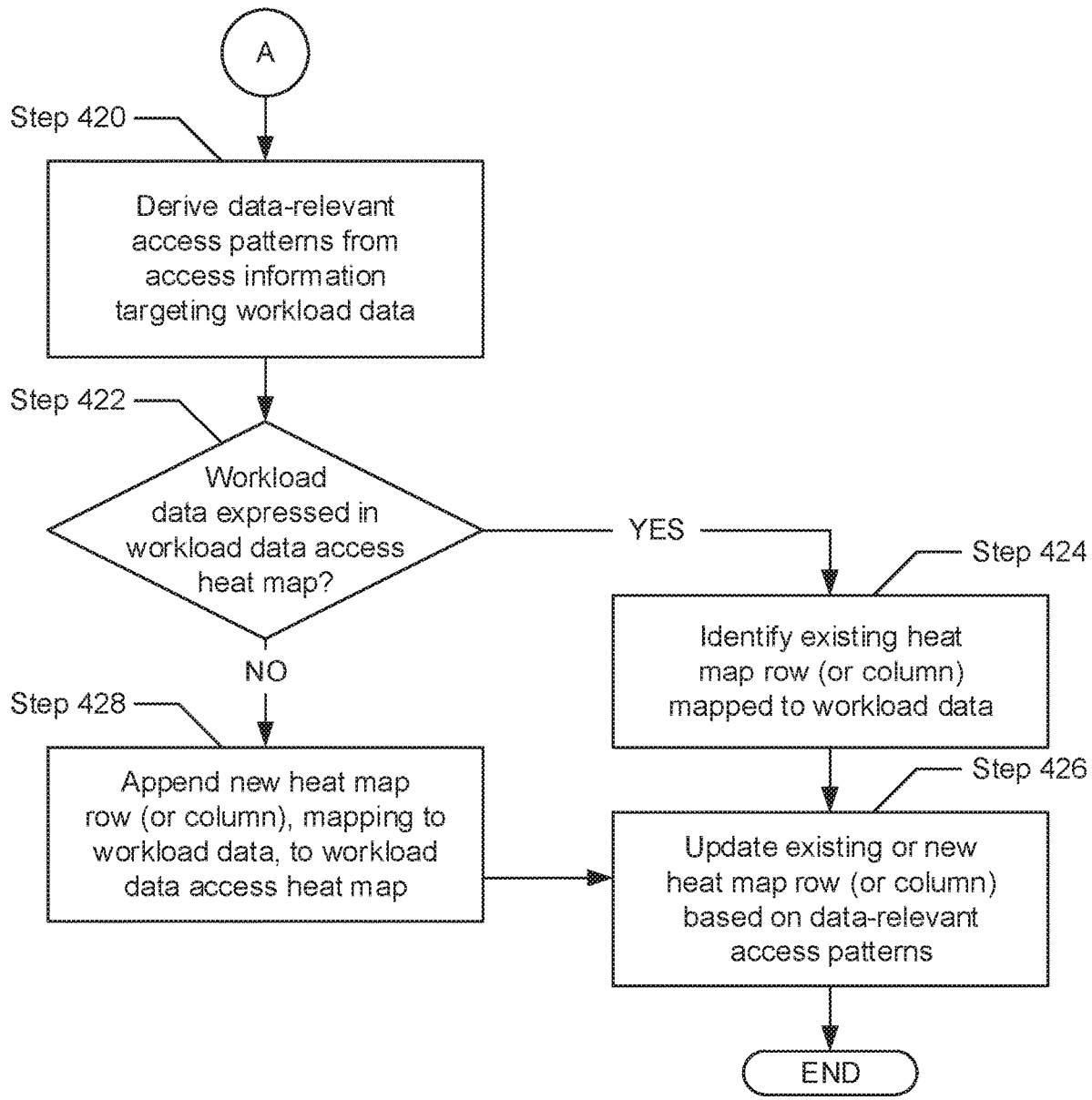

FIGS. 4A and 4B show flowcharts describing a method for updating access heat maps in accordance with one or more embodiments of the invention. The various steps outlined below may be performed by the proximity calculator executing on the proximity placement service (see e.g., FIG. 3). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, an access message is received from an access monitor residing on a cluster infrastructure (see e.g., FIG. 2). In one embodiment of the invention, the access message (i.e., a workload access message) may pertain to an active workload (described above) (see e.g., FIG. 1) that may be hosted on the cluster infrastructure. In such an embodiment, the workload access message may include access information detailing cross-infrastructural (or cross-geographical) accesses that have targeted and/or are targeting the active workload over a recorded period of time or in real-time. The aforementioned access information may include, but is not limited to, log data detailing any established and/or attempted incoming connections, source network (e.g., Internet Protocol (IP)) address(es) associated with the access source(s) of the incoming connections, network interface (or port) information associated with the incoming connections, and geographic details pertaining to the access source(s).

In another embodiment of the invention, the access message (i.e., a workload data access message) may pertain to active workload data stored on the cluster infrastructure. In such an embodiment, the workload data access message may include access information detailing cross-infrastructural (or cross-geographical) accesses that have targeted and/or are targeting the active workload data over a recorded period of time or in real-time. The aforementioned access information may include, but is not limited to, log data detailing any established and/or attempted incoming connections, source network (e.g., Internet Protocol (IP)) address(es) associated with the access source(s) of the incoming connections, network interface (or port) information associated with the incoming connections, and geographic details pertaining to the access source(s).

In Step 402, a determination is made as to whether a workload access message had been received (in Step 400). In one embodiment of the invention, if it is determined that a workload (versus workload data) access message had been received, then the process proceeds to Step 404. On the other hand, in another embodiment of the invention, if it is alternatively determined that a workload data (versus workload) access message had been received, then the process alternatively proceeds to Step 420 (see e.g., FIG. 4B).

In Step 404, following the determination (in Step 402) that a workload access message had been received (in Step 400), workload-relevant access patterns are derived. Specifically, the above-mentioned access information (received via the workload access message in Step 400) may be analyzed or processed using one or more pattern recognition algorithms, which may pivot on one or more existing artificial intelligence, machine learning, data mining, and/or knowledge discovery techniques. These recognized patterns may include, but are not limited to, the geographical location(s) from where the access requests may be arriving, and the frequency and type(s) (e.g., read, write, backup, update, delete) of the aforementioned arriving access requests.

In Step 406, a determination is made as to whether the active workload (to which the workload access message received in Step 400 is directed) is expressed in a workload access heat map (described above) (see e.g., FIG. 3). That is, a given active workload may be expressed in the workload access heat map should one of the various existing dimension (i.e., row or column) indices, of the workload access heat map, correspond to the active workload. Conversely, should none of the existing dimension indices, of the workload heat map, direct to the active workload, then the active workload may not yet be expressed in the workload access heat map. Accordingly, in one embodiment of the invention, if it is determined that the active workload is already expressed in the workload access heat map, then the process proceeds to Step 408. On the other hand, in another embodiment of the invention, if it is alternatively determined that the active workload is not yet expressed in the workload access heat map, then the process alternatively proceeds to Step 412.

In Step 408, following the determination (in Step 406) that the above-mentioned active workload is already expressed in the workload access heat map, an existing dimension (e.g., row or column) index, mapped to the active workload, is identified. That is, in one embodiment of the invention, should the row dimension of the workload access heat map correspond to the various active workloads hosted across the various cluster infrastructures (or geographical areas), then an existing row (denoted by a row index) of the various existing rows, defining the workload access heat map, may specifically correspond to the above-mentioned active workload. In another embodiment of the invention, should the column dimension of the workload access heat map alternatively correspond to the various active workloads hosted across the various cluster infrastructures (or geographical areas), then an existing column (denoted by a column index) of the various existing columns, defining the workload access heat map, may specifically correspond to the above-mentioned active workload.

In Step 410, one or more access intensity (or incoming connection) values, retained across the existing dimension index (identified in Step 408), or the new dimension index (appended in Step 412), for the active workload, is updated based on the workload-relevant access patterns (derived in Step 404). As described above, in one embodiment of the invention, each heat map element along a row or column, corresponding to the active workload, may store an access intensity value reflecting a more recent account of the established and/or attempted incoming connections (or a derivative thereof) directed to the active workload from a given cluster infrastructure or geographical area.

In Step 412, following the alternative determination (in Step 406) that the above-mentioned active workload is yet to be expressed in the workload access heat map, a new dimension (e.g., row or column) index, mapped to the active workload, is appended thereto. That is, in one embodiment of the invention, should the row dimension of the workload access heat map correspond to the various active workloads hosted across the various cluster infrastructures (or geographical areas), then a new row (denoted by a new row index) may be appended alongside the various existing rows, where the new row may specifically correspond to the above-mentioned active workload. In another embodiment of the invention, should the column dimension of the workload access heat map alternatively correspond to the various active workloads hosted across the various cluster infrastructures (or geographical areas), then a new column (denoted by a new column index) may be appended alongside the various existing columns, where the new column may specifically correspond to the above-mentioned active workload. Thereafter, the process proceeds to Step 410, where the one or more heat map elements along the new dimension index (appended to the workload access heat map in Step 412) is/are updated (i.e., populated) based on the workload-relevant access patterns (derived in Step 404).

Turning to FIG. 4B, in Step 420, following the determination (in Step 402) that a workload data access message had been received (in Step 400), data-relevant access patterns are derived. Specifically, the above-mentioned access information (received via the workload data access message in Step 400) may be analyzed or processed using one or more pattern recognition algorithms, which may pivot on one or more existing artificial intelligence, machine learning, data mining, and/or knowledge discovery techniques. These recognized patterns may include, but are not limited to, the storage space or size of the workload data being accessed, the geographical location(s) from where the access requests may be arriving, and the frequency and type(s) (e.g., read, write, backup, update, delete) of the aforementioned arriving access requests.

In Step 422, a determination is made as to whether the workload data (to which the workload data access message received in Step 400 is directed) is expressed in a workload data access heat map (described above) (see e.g., FIG. 3). That is, a given active workload dataset may be expressed in the workload data access heat map should one of the various existing dimension (i.e., row or column) indices, of the workload data access heat map, correspond to the active workload dataset. Conversely, should none of the existing dimension indices, of the workload data access heat map, direct to the active workload dataset, then the active workload dataset may not yet be expressed in the workload data access heat map. Accordingly, in one embodiment of the invention, if it is determined that the active workload data is already expressed in the workload data access heat map, then the process proceeds to Step 424. On the other hand, in another embodiment of the invention, if it is alternatively determined that the active workload data is not yet expressed in the workload data access heat map, then the process alternatively proceeds to Step 428.

In Step 424, following the determination (in Step 422) that the above-mentioned active workload data is already expressed in the workload data access heat map, an existing dimension (e.g., row or column) index, mapped to the active workload data, is identified. That is, in one embodiment of the invention, should the row dimension of the workload data access heat map correspond to the various workload datasets stored across the various cluster infrastructures (or geographical areas), then an existing row (denoted by a row index) of the various existing rows, defining the workload data access heat map, may specifically correspond to the above-mentioned active workload data. In another embodiment of the invention, should the column dimension of the workload data access heat map alternatively correspond to the various active workload datasets stored across the various cluster infrastructures (or geographical areas), then an existing column (denoted by a column index) of the various existing columns, defining the workload data access heat map, may specifically correspond to the above-mentioned active workload data.

In Step 426, one or more access intensity (or incoming connection) values, retained across the existing dimension index (identified in Step 424), or the new dimension index (appended in Step 428), for the active workload data, is updated based on the data-relevant access patterns (derived in Step 420). As described above, in one embodiment of the invention, each heat map element along a row or column, corresponding to the active workload data, may store an access intensity value reflecting a more recent account of the established and/or attempted incoming connections (or a derivative thereof) directed to the active workload data from a given cluster infrastructure or geographical area.

In Step 428, following the alternative determination (in Step 422) that the above-mentioned active workload data is yet to be expressed in the workload data access heat map, a new dimension (e.g., row or column) index, mapped to the active workload data, is appended thereto. That is, in one embodiment of the invention, should the row dimension of the workload data access heat map correspond to the various active workload datasets hosted across the various cluster infrastructures (or geographical areas), then a new row (denoted by a new row index) may be appended alongside the various existing rows, where the new row may specifically correspond to the above-mentioned active workload data. In another embodiment of the invention, should the column dimension of the workload data access heat map alternatively correspond to the various active workload datasets hosted across the various cluster infrastructures (or geographical areas), then a new column (denoted by a new column index) may be appended alongside the various existing columns, where the new column may specifically correspond to the above-mentioned active workload data. Thereafter, the process proceeds to Step 426, where the one or more heat map elements along the new dimension index (appended to the workload data access heat map in Step 428) is/are updated (i.e., populated) based on the data-relevant access patterns (derived in Step 420).

Figure 5:
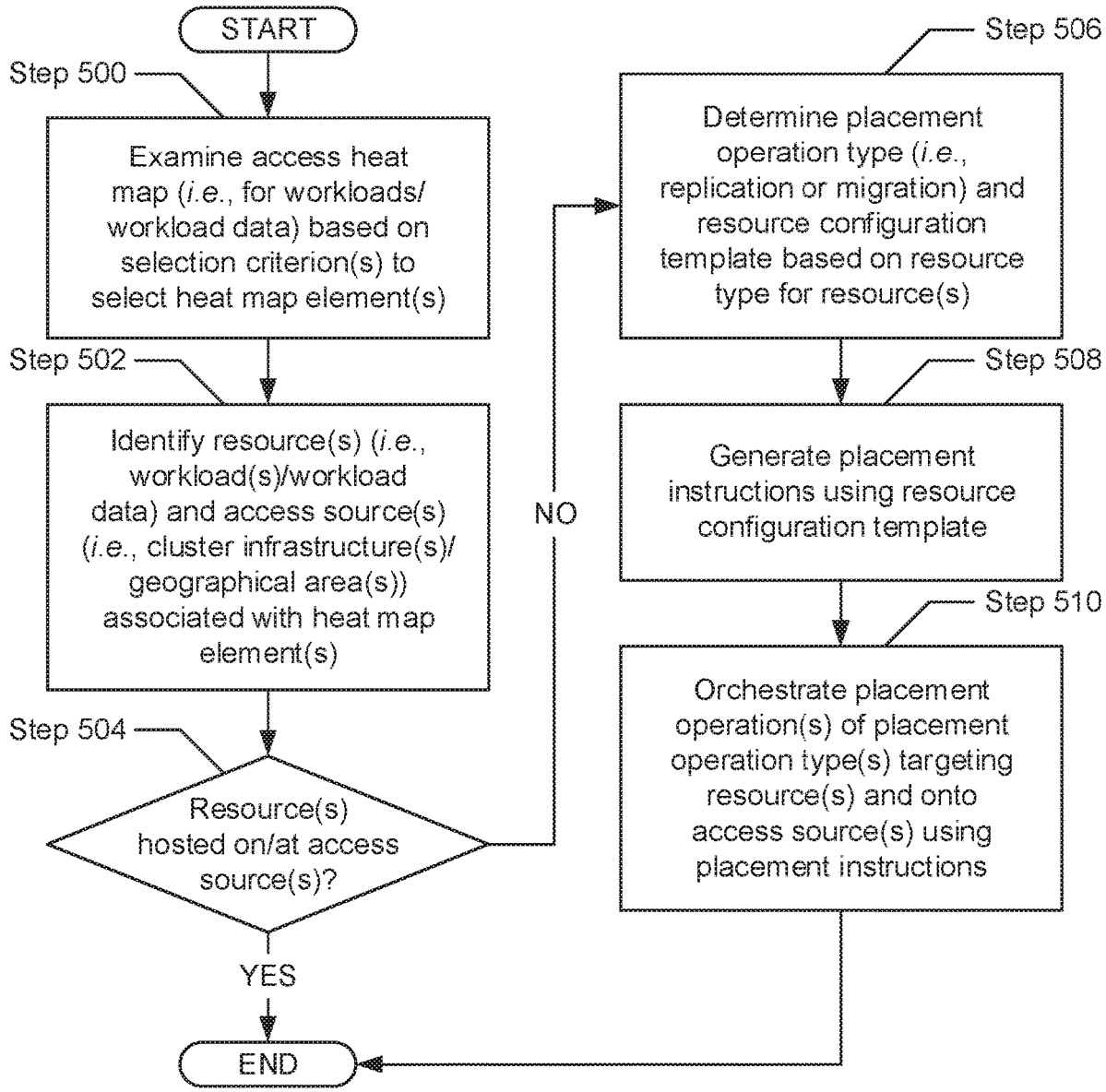
FIG. 5 shows a flowchart describing a method for proximity based workload and data placement in accordance with one or more embodiments of the invention.

FIG. 5 shows a flowchart describing a method for proximity based workload and data placement in accordance with one or more embodiments of the invention. The various steps outlined below may be performed by the placement intelligence executing on the proximity placement service (see e.g., FIG. 3). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, an access heat map (described above) (see e.g., FIG. 3) is examined. In one embodiment of the invention, the access heat map may be directed to active workloads hosted across two or more cluster infrastructures or geographical areas. In another embodiment of the invention, the access heat map may be directed to active workload data (or datasets), which may be maintained across the aforementioned cluster infrastructures or geographical areas. Further, examination of the access heat map may result in the selection of one or more heat map elements based on one or more selection criterions. By way of an example, a selection criterion may require that the access intensity value(s), retained in the identified heat map element(s), meet or exceed an access intensity threshold.

In Step 502, for each heat map element (selected in Step 500), a corresponding resource and access source are identified. In one embodiment of the invention, the resource may refer to an active workload, which may be expressed in the access heat map (described above) (see e.g., FIGS. 4A and 4B). In another embodiment of the invention, the resource may refer to active workload data, which may alternatively be expressed in the access heat map. Furthermore, the access source may pertain to a cluster infrastructure (see e.g., FIG. 1) or a geographical area within which the cluster infrastructure resides and/or services.

In Step 504, a determination is made as to whether the resource(s) (identified in Step 502) is/are hosted (or maintained) on the access source(s) (also identified in Step 502). In one embodiment of the invention, if it is determined that a resource is hosted or maintained on a corresponding access source, then the process ends. On the other hand, in another embodiment of the invention, if it is alternatively determined that a resource is not hosted or maintained on a corresponding access source, then the process alternatively proceeds to Step 506.

In Step 506, following the determination (in Step 504) that the resource(s) (identified in Step 502) is/are not hosted/maintained on the access source(s) (also identified in Step 502), a placement operation type and resource configuration template are identified for each resource based on a resource type of the resource. In one embodiment of the invention, a given resource may either represent an active workload hosted on a cluster infrastructure (or a geographical area), or active workload data, pertinent to an active workload, which may be maintained on shared cluster storage (see e.g., FIG. 2) at the cluster infrastructure (or geographical area). A resource type, subsequently, may refer to a specific classification of either an active workload or active workload data. For example, one or more resources, being workloads, may be broadly directed to applications (i.e., broad classification) and, more specifically directed to web frontend servers (i.e., specific classification or resource type). The aforementioned example is presented for explanatory purposes only and not intended to limit the scope of the invention. Meanwhile, the resource configuration template may refer to a predefined or preformatted document that specifies one or more automation steps directed to the placement of the resource(s) (identified in Step 502) at/on the access source(s) (also identified in Step 502).

Furthermore, in one embodiment of the invention, the above-mentioned placement operation type may refer to the classification of a placement operation through which the resource(s) (identified in Step 502) may be placed more proximal to end-users that have been accessing the resource(s) most recently and/or most frequently. Placement operation types may include, but are not limited to, resource replication, which may entail the instantiation of a real-time replica of the resource on/at the access source (identified in Step 502), and resource migration, which may entail the movement of the resource to the access source. The opted placement operation type, applied to a given resource, may depend on the given resource (or more specifically, the resource type of the given resource). For example, should the resource type of the given resource be directed to a web frontend server, the placement operation type may be directed to resource replication as it would be more sensible and practical to bring up a new instance of the resource at a corresponding access source where end-users thereat may be heavily accessing the resource. By way of another example, should the resource type of the given resource be directed to a structured query language (SQL) database, the placement type of the given resource may alternatively be directed to resource migration as shorter (or more proximal) distances for the exchange of disk input-output (IO) operations may be the more sensible and practical solution.

In Step 508, placement instructions are generated for each resource (identified in Step 502) using the resource configuration template (identified in Step 506). In one embodiment of the invention, the placement instructions may entail end-to-end automation steps for facilitating a placement operation, of the placement operation type (identified in Step 506), of the resource onto the access source (identified in Step 502). These automation steps may, for example, specify one or more computing resource (e.g., processing, storage/memory, virtualization, networking, etc.) requirements needed to provision, deploy, or implement the resource onto the access source.

In Step 510, one or more placement operations is/are orchestrated for the resource(s) (identified in Step 502). Specifically, in one embodiment of the invention, the placement operation(s) may entail the migration or replication of the resource(s) to the respective access source(s) (also identified in Step 502). Further, the placement operation(s) may be implemented in accordance with the placement instructions (generated in Step 508).

Figure 6:
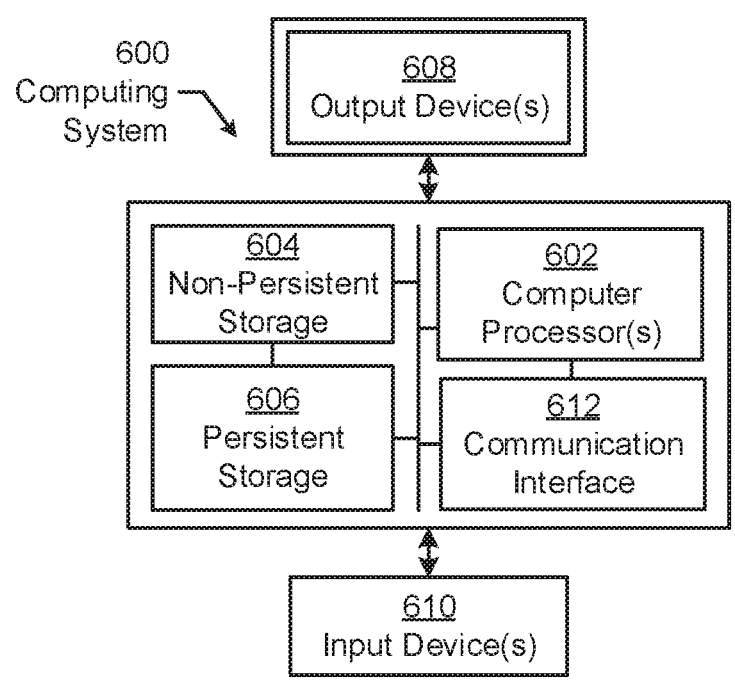
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (504) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for resource placement, comprising:
   selecting, from an access heat map, a first heat map element using a selection criterion;
   identifying, in association with the first heat map element, a first resource and a first access source;
   determining, based on a first resource type of the first resource, a first placement operation type; and
   orchestrating, onto the first access source, a first placement operation of the first placement operation type targeting the first resource,
   wherein the first access source is a geographical area;
   selecting a second heat map element from the access heat map using the selection criterion;
   identifying, in association with the second heat map element, a second resource and a second access source;
   determining, based on a second resource type of the second resource, a second placement operation type; and
   orchestrating, onto the second access source, a second placement operation of the second placement operation type targeting the second resource,
   wherein the first resource type is active workload data that is specified in the access heat map and that species computing resources including processing, storage, virtualization, and networking used by one or more active workloads, and the second resource type is an active workload of the one or more active workloads.

2. The method of claim 1, wherein the first heat map element comprises an access intensity value.

3. The method of claim 2, wherein the selection criterion requires the access intensity value to at least meet an access intensity threshold.

4. The method of claim 1, wherein the first resource is one selected from a group consisting of an active workload not hosted on the first access source and active workload data not maintained at the first access source.

5. The method of claim 1, wherein a resource configuration template is further determined based on the first resource type of the first resource.

6. The method of claim 5, further comprising:
   prior to orchestrating the first placement operation:
      generating placement instructions based on the resource configuration template,
      wherein orchestration of the first placement operation uses the placement instructions.

7. The method of claim 1, wherein the first placement operation type is one selected from a group consisting of a resource replication and a resource migration.

8. A non-transitory computer readable medium (CRM) comprising computer readable program code, which when executed by a computer processor, enables the computer processor to:
   select, from an access heat map, a first heat map element using a selection criterion;
   identify, in association with the first heat map element, a first resource and a first access source;
   determine, based on a first resource type of the first resource, a first placement operation type; and
   orchestrate, onto the first access source, a first placement operation of the first placement operation type targeting the first resource,
   wherein the first access source is a geographical area;
   selecting a second heat map element from the access heat map using the selection criterion;
   identifying, in association with the second heat map element, a second resource and a second access source;
   determining, based on a second resource type of the second resource, a second placement operation type; and
   orchestrating, onto the second access source, a second placement operation of the second placement operation type targeting the second resource,
   wherein the first resource type is active workload data that is specified in the access heat map and that species computing resources including processing, storage, virtualization, and networking used by one or more active workloads, and the second resource type is an active workload of the one or more active workloads.

9. The non-transitory CRM of claim 8, wherein the first heat map element comprises an access intensity value.

10. The non-transitory CRM of claim 9, wherein the selection criterion requires the access intensity value to at least meet an access intensity threshold.

11. The non-transitory CRM of claim 8, wherein the first resource is one selected from a group consisting of an active workload not hosted on the first access source and active workload data not maintained at the first access source.

12. The non-transitory CRM of claim 8, wherein a resource configuration template is further determined based on the first resource type of the first resource.

13. The non-transitory CRM of claim 12, comprising computer readable program code, which when executed by the computer processor, further enables the computer processor to:
   prior to orchestrating the first placement operation:
   generate placement instructions based on the resource configuration template,
      wherein orchestration of the first placement operation uses the placement instructions.

14. The non-transitory CRM of claim 8, wherein the first placement operation type is one selected from a group consisting of a resource replication and a resource migration.

* * * * *